(12) United States Patent
Lee et al.

(10) Patent No.: US 10,212,102 B2
(45) Date of Patent: Feb. 19, 2019

(54) METHOD AND APPARATUS FOR BUFFERING V2X MESSAGE FOR PATH SWITCHING IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/462,009

(22) Filed: Mar. 17, 2017

(65) Prior Publication Data

US 2017/0272384 A1 Sep. 21, 2017

Related U.S. Application Data

(60) Provisional application No. 62/309,926, filed on Mar. 17, 2016, provisional application No. 62/313,113, filed on Mar. 24, 2016, provisional application No. 62/317,427, filed on Apr. 1, 2016.

(51) Int. Cl.
*H04L 12/947* (2013.01)
*H04W 4/04* (2009.01)
*H04L 12/863* (2013.01)

(52) U.S. Cl.
CPC .......... *H04L 49/252* (2013.01); *H04L 47/625* (2013.01); *H04W 4/046* (2013.01)

(58) Field of Classification Search
None
See application file for complete search history.

(56) References Cited

U.S. PATENT DOCUMENTS

| | | | |
|---|---|---|---|
| 2006/0198341 A1* | 9/2006 | Singh | H04W 36/12 370/331 |
| 2007/0183320 A1* | 8/2007 | Chen | H04L 47/527 370/229 |
| 2015/0009961 A1* | 1/2015 | Natarajan | H04B 7/15521 370/331 |
| 2017/0367100 A1* | 12/2017 | Sorrentino | H04W 72/082 |

* cited by examiner

*Primary Examiner* — Anh Ngoc M Nguyen
(74) *Attorney, Agent, or Firm* — Lee, Hong, Degerman, Kang & Waimey

(57) ABSTRACT

During path switching between sidelink (SL) and uplink (UL) for vehicle-to-everything (V2X) message transmission, a path switching layer of a user equipment (UE), which may be located right above a packet data convergence protocol (PDCP) layer of the UE, stores a vehicle-to-everything (V2X) message, which is not transmitted yet on an old path, in a transmission buffer. And then, the path switching layer of the UE re-submits the V2X message stored in the transmission buffer to a lower layer of a new path.

12 Claims, 10 Drawing Sheets

METHOD AND APPARATUS FOR BUFFERING V2X MESSAGE FOR PATH SWITCHING IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application Nos. 62/309,926, filed on Mar. 17, 2016, 62/313,113, filed on Mar. 24, 2016 and 62/317,427, filed on Apr. 1, 2016, the contents of which are hereby incorporated by reference herein in their entirety.

BACKGROUND OF THE INVENTION

Field of the Invention

The present invention relates to wireless communications, and more particularly, to a method and apparatus for buffering a vehicle-to-everything (V2X) message for path switching in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

Early completion of the corresponding radio access network (RAN) specification for PC5-based V2V and integration with Uu interface will enable fast preparation for device and network implementation, thereby allowing more chance for LTE-based V2V in the market. In addition, it can provide the basis for other V2X services, especially vehicle-to-infrastructure/network (V2I/N) and vehicle-to-pedestrian (V2P) services, so that RAN support for all the V2X services can be completed in time.

SUMMARY OF THE INVENTION

The present invention provides a method and apparatus for buffering a vehicle-to-everything (V2X) message for path switching in a wireless communication system. The present invention provides path switching function storing a V2X message in a transmission buffer to re-submit the stored V2X message that is not transmitted yet on an old path to lower layers of a new path while path switching.

In an aspect, a method for buffering a vehicle-to-everything (V2X) message for path switching, by a path switching layer of a user equipment (UE), in a wireless communication system is provided. The method includes storing the V2X message, which is not transmitted yet on an old path, in a transmission buffer, and re-submitting the V2X message stored in the transmission buffer to a lower layer of a new path.

In another aspect, a user equipment (UE) in a wireless communication system is provided. The UE includes a memory, a transceiver, and a processor, coupled to the memory and the transceiver, that stores, by a path switching layer of the UE, a vehicle-to-everything (V2X) message, which is not transmitted yet on an old path, in a transmission buffer, and re-submits, by the path switching layer of the UE, the V2X message stored in the transmission buffer to a lower layer of a new path.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE. For clarity, the following description will focus on the LTE-A. However, technical features of the present invention are not limited thereto.

Figure 1:
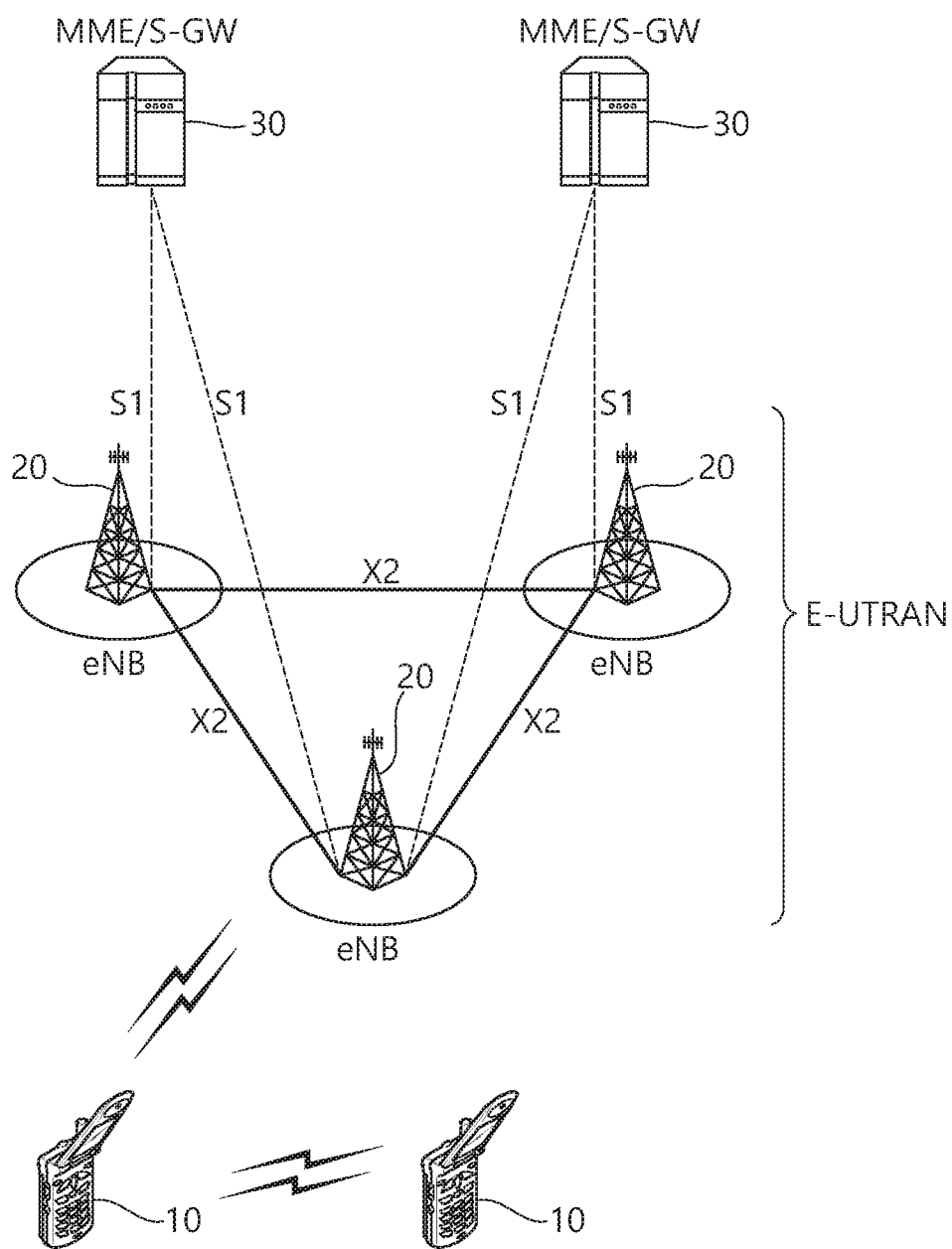
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
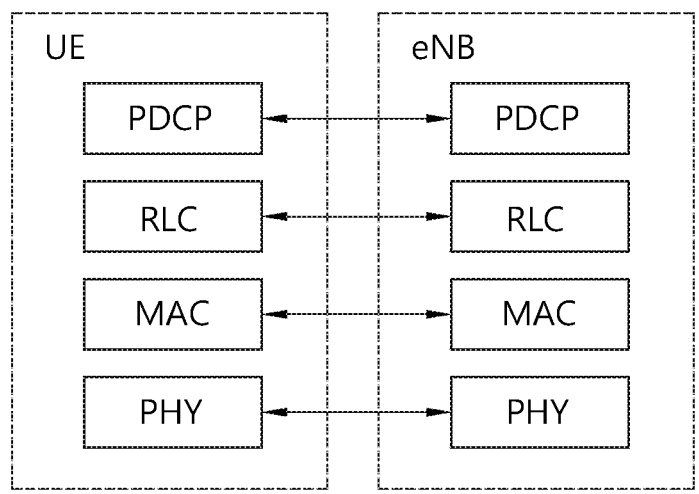
FIG. 2 shows a block diagram of a user plane protocol stack of an LTE system.
Figure 3:
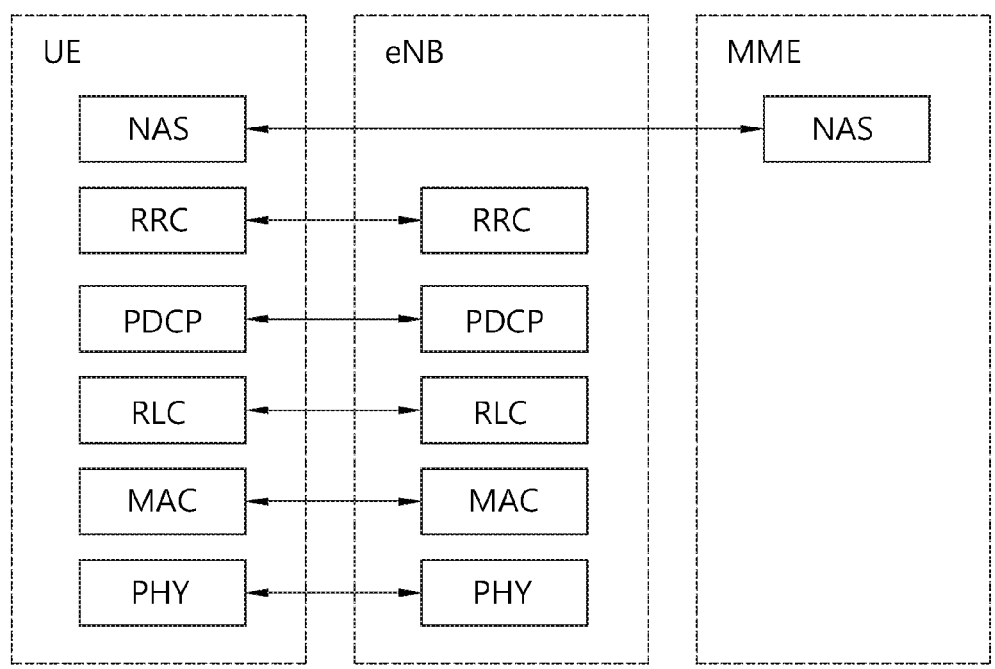
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change in order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink (SL) is described. Sidelink is UE to UE interface for sidelink communication and sidelink discovery. The sidelink corresponds to the PC5 interface. Sidelink communication is AS functionality enabling proximity-based services (ProSe) direct communication, between two or more nearby UEs, using E-UTRA technology but not traversing any network node. Sidelink discovery is AS functionality enabling ProSe direct discovery, using E-UTRA technology but not traversing any network node. Sidelink uses UL resources and physical channel structure similar to UL transmissions. However, sidelink is limited to single cluster transmissions for all the sidelink physical channels. Further, sidelink uses a 1 symbol gap at the end of each sidelink subframe.

Figure 4:
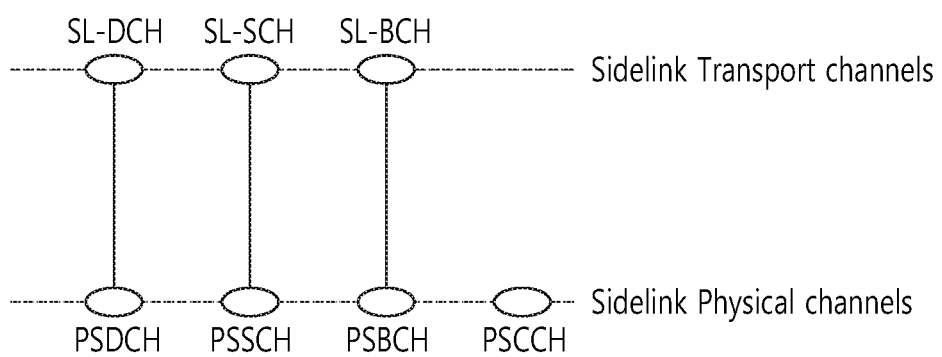
FIG. 4 shows mapping between sidelink transport channels and sidelink physical channels.

FIG. 4 shows mapping between sidelink transport channels and sidelink physical channels. Referring to FIG. 4, a physical sidelink discovery channel (PSDCH), which carries sidelink discovery message from the UE, is mapped to a sidelink discovery channel (SL-DCH). A physical sidelink shared channel (PSSCH), which carries data from a UE for sidelink communication, is mapped to a sidelink shared channel (SL-SCH). A physical sidelink broadcast channel (PSBCH), which carries system and synchronization related information transmitted from the UE, is mapped to a sidelink broadcast channel (SL-BCH). A physical sidelink control channel (PSCCH) carries control from a UE for sidelink communication.

Figure 5:
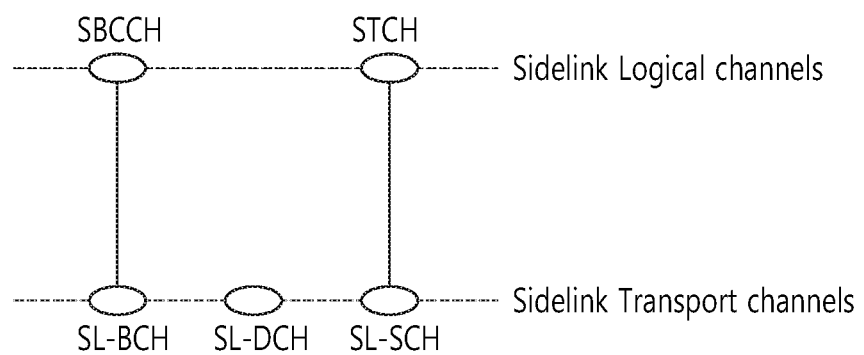
FIG. 5 shows mapping between sidelink logical channels and sidelink transport channel.

FIG. 5 shows mapping between sidelink logical channels and sidelink transport channel. Referring to FIG. 5, the SL-BCH is mapped to a sidelink broadcast channel (SB- CCH). The SBCCH is a sidelink channel for broadcasting sidelink system information from one UE to other UE(s). This channel is used only by sidelink communication capable UEs. The SL-SCH is mapped to a sidelink traffic channel (STCH). The STCH is a point-to-multipoint channel, for transfer of user information from one UE to other UEs. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, the UE uses pre-configured parameters. System information block type-18 (SIB18) provides the resource information for synchronization signal and SBCCH transmission. There are two pre-configured subframes every 40 ms for out of coverage operation. The UE receives synchronization signal and SBCCH in one subframe and transmit synchronization signal and SBCCH on another subframe if the UE becomes synchronization source based on defined criterion.

The UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
  Uu transmission/reception (highest priority);
  PC5 sidelink communication transmission/reception;
  PC5 sidelink discovery announcement/monitoring (lowest priority).

The UE supporting sidelink communication can operate in two modes for resource allocation. The first mode is scheduled resource allocation. The scheduled resource allocation may be called Mode 1. In mode 1, the UE needs to be RRC_CONNECTED in order to transmit data. The UE requests transmission resources from the eNB. The eNB schedules transmission resources for transmission of sidelink control information and data. The UE sends a scheduling request (dedicated SR or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is UE autonomous resource selection. The second mode may be called Mode 2. In mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), the UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if mode 2 is used. The resource pool used for transmission is configured by the eNB via RRC, in dedicated signaling if mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signal\ling, if mode 2 is used. There is no resource pool for transmission and reception if scheduled resource allocation is used.

Sidelink discovery is defined as the procedure used by the UE supporting sidelink discovery to discover other UE(s) in its proximity, using E-UTRA direct radio signals via PC5. Sidelink discovery is supported both when UE is served by E-UTRAN and when UE is out of E-UTRA coverage. Only ProSe-enabled public safety UE can perform sidelink discovery when it is out of E-UTRA coverage. For public safety sidelink discovery, the allowed frequency is pre-configured in the UE, and is used even when UE is out of coverage of E-UTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection, which is a resource allocation procedure where resources for announcing of discovery message are allocated on a non UE specific basis. The UE autonomous resource selection may be called Type 1. In type 1, the eNB provides the UE(s) with the resource pool configuration used for announcing of discovery message. The configuration may be signalled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation, which is a resource allocation procedure where resources for announcing of discovery message are allocated on per UE specific basis. The scheduled resource allocation may be called Type 2. In type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for type 1 based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. The UE can also indicate to the eNB, the frequency(s) in which sidelink discovery announcement is desired. The eNB validates whether the UE is authorized for sidelink discovery announcement using the UE context received from MME. The eNB may configure the UE with resource pool for type 1 for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB reconfigures the resource(s) by RRC signaling or the UE enters RRC_IDLE.

Authorized receiving UEs in RRC_IDLE and RRC_CONNECTED monitor resource pools used for type 1 and resource pools for type 2. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Hereinafter, path selection and/or path switching is described. 3GPP aims to support both PC5 transport and Uu transport of V2X service. This intention leads to introduction of path switching between PC5 and Uu for V2V service. Various use cases have been considered for path switching. Path switching should be considered in the area where both PC5 and Uu are used for V2V. Furthermore, path switching mechanism intends to switch transmission path because it seems likely that vehicles need to monitor both PC5 and Uu in the area where PC5 and Uu are used for V2V.

The followings are various use cases of path switching between PC5 and Uu.

(1) Insufficient PC5/Uu Capacity

Capacity of Uu or PC5 may not be sufficient particularly in urban cases, e.g. during rush hours in metropolitan cities. Considering such insufficient capacity, the eNB could trigger path switching so that eNB offloads V2X messages from one path to the other path. For instance, if UL or DL capacity is not sufficient for V2V, the eNB may offload V2X messages to PC5. If congestion frequently occurs on PC5, eNB may offload V2X message to Uu. In this use case, path switching needs to be controlled for each cell. Since path switching will be used in the case where both PC5 and Uu are used for V2V, it seems likely to support per cell path switching in this use case. And, the eNB should be able to offload a portion of UEs transmitting V2X messages from one path to the other path for a cell.

(2) Co-Existence with Dedicated Short Range Communication (DRSC)

PC5 transport for V2V services and DSRC/IEEE 802.11p services in the same channel may coexist. Path switching can be one solution for coexistence. For instance, when UE detects coexistence situation or when the network knows potential coexistence with DSRC in a certain area, Uu transport can be selected for V2V based on eNB decision.

(3) Connection Failure or Out-of-Coverage (OOC)

When the UE moves to OOC or RRC_IDLE, UL transmissions are not possible. In addition, when UE detects radio link failure (RLF) or handover failure (HOF), UE transmissions are not possible, either. Thus, it seems likely that UE needs to switch to PC5 in those cases. Meanwhile, in this use case, the UE would be able to autonomously select or reselect one of PC5 and Uu transport for V2V transmissions, e.g. based on criteria provided by eNB. This use case would be useful for abnormal situation handling.

Path selection will not occur frequently in all use cases. However, vehicles moving on highway will change a cell frequently, e.g. every a few seconds, and so path switching might occur whenever cell changes in case contiguous cells selected different paths.

When the selected path is determined, the UE may not need to quickly switch to the selected path in the first use case and the second use case assuming that the UE would be still able to transmit V2X message on the old path. However, in the third use case, the UE would need to quickly switch to the new path, i.e. PC5, to avoid message loss because the UE cannot transmit in UL while in OOC, RRC_IDLE, HOF or RLF.

Figure 6:
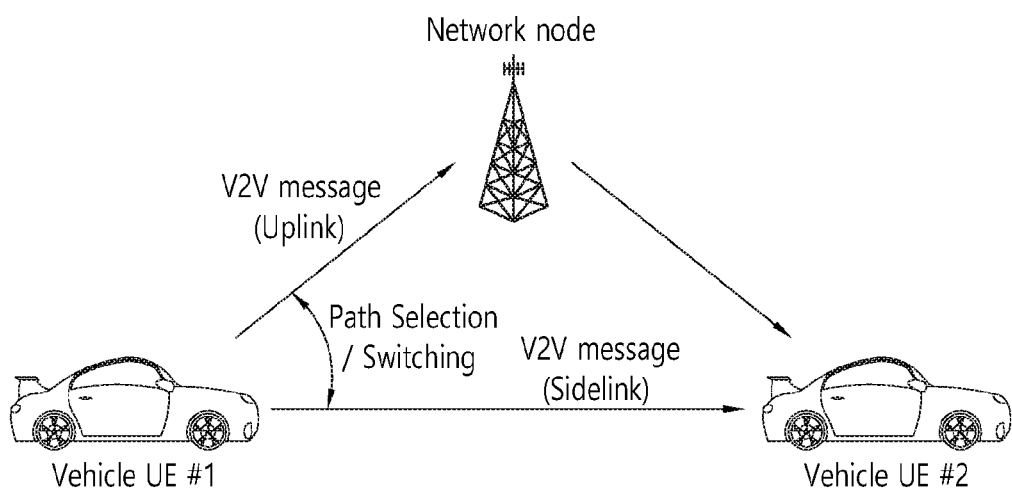
FIG. 6 shows an example of path switching for V2V message according to an embodiment of the present invention.

FIG. 6 shows an example of path switching for V2V message according to an embodiment of the present invention. Referring to FIG. 6, the vehicle UE #1 may transmit the V2V message to a network node (e.g. eNB) via uplink. The network node may transmit the received V2V message to the vehicle UE #2. Or, the vehicle UE #1 may transmit the V2V message to the vehicle UE #2 via sidelink directly. The path on which the vehicle UE #1 transmits the V2V message, i.e. uplink or sidelink, may be selected. Further, while the V2V message is being transmitted via one path and if the other path is selected, path on which the V2V message is transmitted may be switched to the selected path.

E-UTRAN may select the path between PC5 and Uu for transport of V2V messages within network coverage. The first and the second use case can be supported by E-UTRAN's path selection. In the meantime, the UE would need to autonomously select the path to support the third use case above and possibly the second use case. Thus, the path may be selected by either eNB or UE transmitting V2X message. If UE selects the path, the path selection may be based on the criterion provided by the network. Path switching based on the path selection may be performed by UE.

When the eNB selects the path, the eNB may use its own information. For instance, the eNB would know Uu resource deficiency and potentially PC5 resource deficiency when sidelink transmissions are scheduled by the eNB. However, the UE may report some information to the eNB for the path selection. For instance, the UE may report coexistence with DSRC or congestion problem in sidelink when sidelink transmissions are based on mode 2 operation. Such UE reporting may be essential for V2X service because of criticality of V2X service considering that congestion problem will lead to a number of lost V2X messages. In addition, the UE may periodically report geo-information (e.g. vehicle location) to the eNB for PC5 V2V. Sensing with semi-persistent transmission may be supported for UE autonomous resource selection in PC5 V2V. Thus, vehicle UEs may be capable of reporting information on PC5 resource status to the eNB by using sensing. At least the report from the UE may include information on PC5 resource status measured by the UE. In addition, co-existence with DSRC may also be included in the report from the UE because the eNB may not know co-existence with DSRC in some areas, e.g. near country boundaries. When UE reporting is supported, the eNB may be able to configure this reporting.

When the path is selected by the eNB, the eNB needs to indicate the selected path to one or more UEs. This indication may be done by system information and/or UE dedicated signaling. Considering the use cases above, the indication on system information may need to directly indicate the selected path for all vehicles in a cell or indicate a portion of vehicles for each path, e.g. probability, access classes stored in vehicles' universal subscription identification module (USIMs) (if available). That is, for path selection per cell, the eNB may indicate the selected path for all vehicles at a cell or a portion of vehicles for each path by using system information. For path selection per UE at a cell, the eNB may indicate the selected path to a UE by using UE dedicated signaling.

Following the path selection above, the UE may perform path switching to the selected path for V2X transmissions, i.e. either sidelink or uplink.

Figure 7:
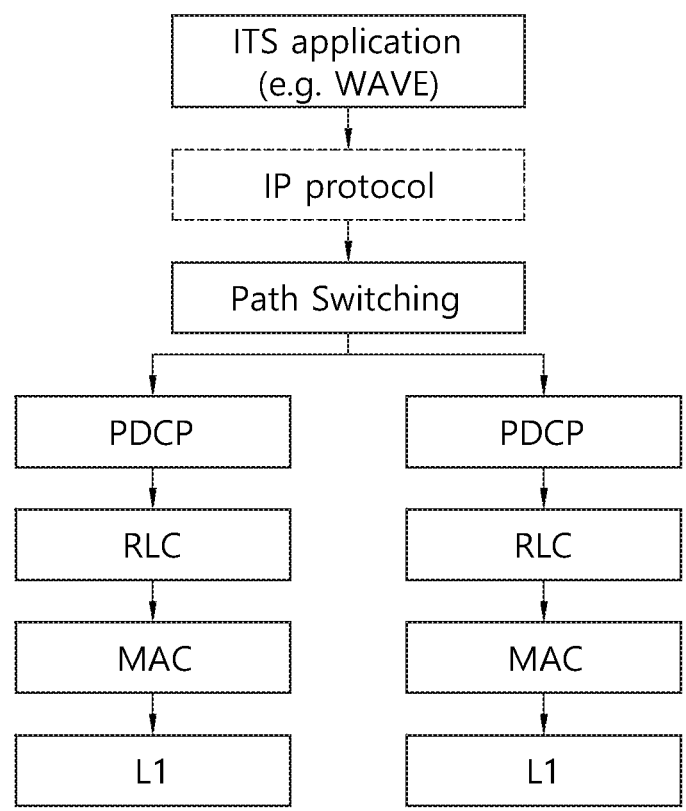
FIG. 7 shows an example of path switching model in a UE.

FIG. 7 shows an example of path switching model in a UE. Referring to FIG. 7, a new layer between intelligent transportation systems (ITS) application layer and PDCP layer (e.g. access network discovery and selection function (ANDSF) or LTE-wireless local area network (WLAN) radio level integration with IPsec tunnel (LWIP) for LTE-WLAN interworking) may perform path switching. It may be preferable that path switching should be performed right above PDCP layer because security functionality is different between sidelink and uplink. This new layer may perform functions other than switching. The new layer may perform identification of radio bearers e.g. for logical channel prioritization (LCP). That is, the new layer may identify message type, e.g. separation of periodic messages and event-triggered messages. Or, the new layer may perform identification of priority, e.g. PPPP or quality of service (QoS) (related to LCP and resource pool selection). That is, the new layer may identify message type, device type (e.g. vehicular UE, emergency UE (firefighter in disaster, police car in tracing), UE type RSU, pedestrian UE).

When the UE performs the path switching, the UE should release old L2 entities for the old path and establish new L2 entities for the new path. In this case, messages in L2 buffer of the old path may be discarded and so these messages may be lost inside UE. Such message loss may be critical if event-triggered message is generated and stored in the old L2 buffer.

In order to solve the problem described above, a method for buffering and retransmitting V2X message for path switching is proposed according to an embodiment of the present invention. In path switching, old PDCP/RLC may be released in one path with discarding data while new PDCP/RLC is established in another path. According to an embodiment of the present invention, path switching function, above PDCP layer, may provide a transmission buffer to store a V2X message which is not transmitted yet. When the UE performs path switching, the path switching function may serve as anchor and re-submit the stored V2X message that is not transmitted yet on the old path to a new PDCP/RLC entity of the new path. The V2X message in the transmission buffer of the path switching function may need to be discarded when latency requirement cannot be met. In this case, sequence number (SN) may not be needed at this new layer because in-sequence delivery seems not to be needed and message loss does not need to be detected per TX source. But, SN may be useful for path switching in wearable SI.

Figure 8:
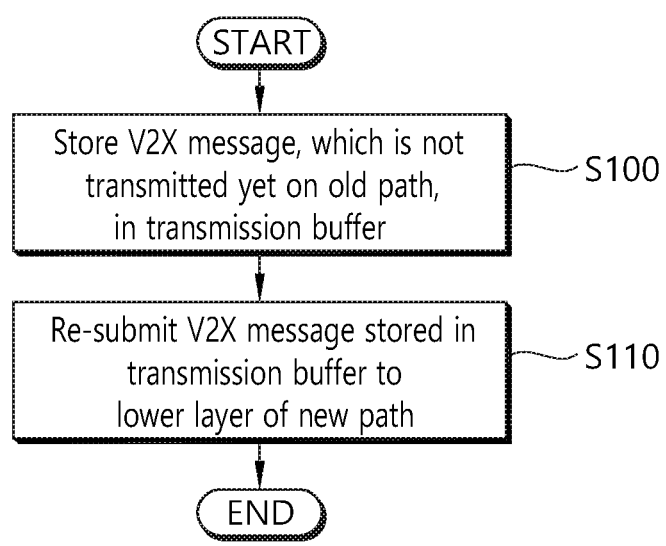
FIG. 8 shows a method for buffering a V2X message for path switching according to an embodiment of the present invention.

FIG. 8 shows a method for buffering a V2X message for path switching according to an embodiment of the present invention. In step S100, the path switching layer of the UE stores the V2X message, which is not transmitted yet on an old path, in a transmission buffer. In step S110, the path switching layer of the UE re-submits the V2X message stored in the transmission buffer to a lower layer of a new path. The path switching layer of the UE may be located right above a PDCP layer of the UE. The lower layer may be one of a PDCP layer of the UE or a RLC layer of the UE. The old path may an UL and the new path may be a SL. Or, the old path may be a SL and the new path may be a UL. The path switching layer of the UE may further discard the V2X message stored in the transmission buffer when latency requirement is not met.

Hereinafter, logical channel for V2X communication according to an embodiment of the present invention and LCP and MAC PDU based on the logical channel for V2X communication is described.

Figure 9:
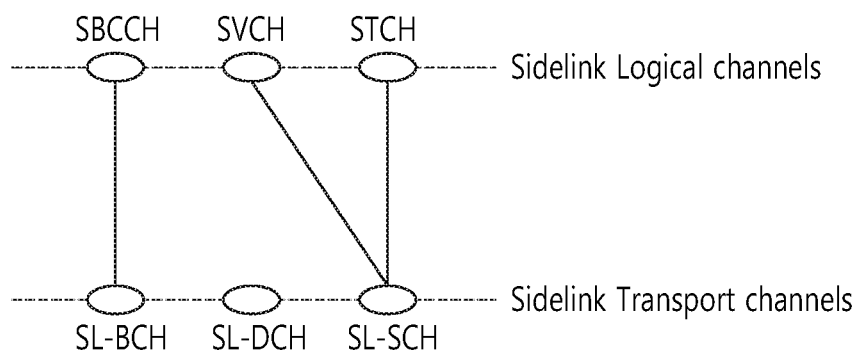
FIG. 9 shows an example of mapping between sidelink logical channels and sidelink transport channel according to an embodiment of the present invention.

FIG. 9 shows an example of mapping between sidelink logical channels and sidelink transport channel according to an embodiment of the present invention. Compared to FIG. 5, referring to FIG. 9, sidelink V2X logical channel (SVCH) is newly defined. The SVCH is mapped to SL-SCH. SL-SCH may carry data from either SVCH or STCH.

Hereinafter, LCP according to an embodiment of the present invention is described. The LCP procedure is applied when a new transmission is performed. Each sidelink logical channel has an associated priority which is the PPPP. Multiple sidelink logical channels may have the same associated priority. The MAC entity may perform the following LCP procedure for each sidelink control information (SCI) transmitted in a sidelink control period:

The MAC entity shall allocate resources to the sidelink logical channels in the following steps:

1) Step 1: Select either data from SVCH or data from STCH. The data from SVCH has a higher priority than the data from STCH. Thus, if data from SVCH is available, UE selects the data from SVCH.

2) Step 2: If, data from SVCH is not available, select a ProSe destination, not previously selected for this sidelink control period, having the sidelink logical channel with the highest priority, among the sidelink logical channels having data available for transmission;

3) Step 3: Among the sidelink logical channels belonging to the selected ProSe destination or V2X and having data available for transmission, allocate resources to the sidelink logical channel with the highest priority;

4) Step 4: if any resources remain, sidelink logical channels belonging to the selected ProSe destination or V2X are served in decreasing order of priority until either the data for the sidelink logical channel(s) or the SL grant is exhausted, whichever comes first. Sidelink logical channels configured with equal priority should be served equally.

The UE shall also follow the rules below during the scheduling procedures above:

The UE shall perform the following LCP procedure when a new transmission is performed:

The UE shall allocate resources to the STCH according to the following rules. The UE should not segment an RLC service data unit (SDU) (or partially transmitted SDU) if the whole SDU (or partially transmitted SDU) fits into the remaining resources. If the UE segments an RLC SDU from the sidelink logical channel, it shall maximize the size of the segment to fill the grant as much as possible. The UE should maximize the transmission of data. If the MAC entity is given an sidelink grant size that is equal to or larger than 10 bytes while having data available for transmission, the MAC entity shall not transmit only padding The UE shall allocate resources to the SVCH according to the following rules. The UE should not segment an RLC SDU. If the MAC entity is given an sidelink grant size that is equal to or larger than 10 bytes while having data available for transmission, the MAC entity shall not transmit only padding.

For PDU(s) associated with one SCI, MAC shall consider either only SVCH or only STCH. If STCH is considered, MAC shall consider only logical channels with the same source layer-2 ID-destination Layer-2 ID pair. For STCH, multiple transmissions within overlapping sidelink control periods to different ProSe destinations are allowed subject to single-cluster SC-FDM constraint.

MAC PDU for SL-SCH according to an embodiment of the present invention is described. A MAC PDU for SL-SCH consists of a MAC header, one or more MAC SDU, and optionally padding. Both the MAC header and the MAC SDUs are of variable sizes. A MAC PDU header consists of one SL-SCH subheader, one or more MAC PDU subheaders. Each subheader except SL-SCH subheader corresponds to either a MAC SDU or padding. For STCH on SL-SCH, the SL-SCH subheader consists of the seven header fields V/R/R/R/R/source (SRC)/destination (DST). For SVCH on SL-SCH, the SL-SCH subheader consists of the five header fields V/R/R/R/R (i.e. no SRC/DST is included) or the six header fields V/R/R/R/R/SRC (i.e. no DST is included). A MAC PDU subheader consists of the six header fields R/R/E/LCID/F/L but for the last subheader in the MAC PDU. The last subheader in the MAC PDU consists solely of the four header fields R/R/E/LCID. A MAC PDU subheader corresponding to padding consists of the four header fields R/R/E/LCID.

MAC PDU subheaders have the same order as the corresponding MAC SDUs and padding. Padding occurs at the end of the MAC PDU, except when single-byte or two-byte padding is required. Padding may have any value and the MAC entity shall ignore it. When padding is performed at the end of the MAC PDU, zero or more padding bytes are allowed. When single-byte or two-byte padding is required, one or two MAC PDU subheaders corresponding to padding are placed after the SL-SCH subheader and before any other MAC PDU subheader. A maximum of one MAC PDU can be transmitted per TB.

The MAC header is of variable size and consists of the following fields:

V: The MAC PDU format version number field indicates which version of the SL-SCH subheader is used. According to an embodiment of the present invention, three format versions are defined, and this field may therefore be set to "0001" or "0010" or "0011". The V field size is 4 bits. One of the V field value may indicate that the MAC PDU including the SL-SCH subheader carries data/information from SVCH. Alternatively, one of the V field value may indicate that the MAC PDU including the SL-SCH subheader includes no DST. Alternatively, one of the V field value may indicate that the MAC PDU including the SL-SCH subheader includes neither SRC nor DST. Alternatively, one of the V field value may indicate that the MAC PDU including the SL-SCH subheader includes no SRC.

SRC: The source layer-2 ID field carries the identity of the source. It is set to the ProSe UE ID. The SRC field size is 24 bits. If the V field is set to "0001", this identifier is a groupcast identifier. If the V field is set to "0010", this identifier is a unicast identifier. If the V field is set to "0011" or a specific value, this identifier is a V2X identifier which indicates either a V2V message, V2P message, V2I message, V2X message, vehicular UE, a specific type of source UE supporting V2X (or V2V, V2P, V2I or V2N).

DST: The DST field carries the 16 most significant bits of the destination layer-2 ID. The destination layer-2 ID is set to the ProSe layer-2 group ID. If the V field is set to "0001", this identifier is a groupcast identifier. If the V field is set to "0010", this identifier is a unicast identifier If the V field is set to "0011" or a specific value, this identifier is a V2X identifier which indicates either a V2V message, V2P message, V2I message, V2X message, vehicular UE, a specific type of destination UE supporting V2X (or V2V, V2P, V2I or V2N).

LCID: The logical channel ID field for STCH uniquely identifies the logical channel instance within the scope of one source layer-2 ID and destination layer-2 ID pair of the corresponding MAC SDU or padding as described below in Table 1. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The LCID field size is 5 bits. The logical channel ID field for SVCH uniquely identifies the logical channel instance within the scope of one source layer-2 ID and destination layer-2 ID pair of the corresponding MAC SDU or padding as described below in Table 1.

TABLE 1

| Index | LCID values |
| --- | --- |
| 00000 | Reserved |
| 00001-01010 | Identity of the STCH logical channel |
| 01011-11011 | Identify of the SVCH logical channel |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

L: The length field indicates the length of the corresponding MAC SDU in bytes. There is one L field per MAC PDU subheader except for the last subheader. The size of the L field is indicated by the F field.

F: The Format field indicates the size of the Length field as indicated below in Table 2. There is one F field per MAC PDU subheader except for the last subheader. The size of the F field is 1 bit. If the size of the MAC SDU is less than 128 bytes, the value of the F field is set to 0, otherwise it is set to 1.

TABLE 2

| Index | Size of Length field (in bits) |
| --- | --- |
| 0 | 7 |
| 1 | 15 |

E: The Extension field is a flag indicating if more fields are present in the MAC header or not. The E field is set to "1" to indicate another set of at least R/R/E/LCID fields. The E field is set to "0" to indicate that either a MAC SDU or padding starts at the next byte.

R: Reserved bit, set to "0".

V, R, E, F or L field can indicate that the corresponding MAC SDU is data from SVCH. V, R, E, F or L field can indicate that L field is not included. The MAC header and subheaders are octet aligned.

Meanwhile, the V2X message is very time critical so that the V2X message is required to be delivered from the source UE to the interested destination UEs within the limited time. However, some V2X messages are expected to be generated irregularly. Hence, it is necessary to cope with the irregular message generation to meet the latency requirement. For this, according to an embodiment of the present invention, the UE may determine whether the configured semi-persistent scheduling (SPS) is appropriate for transmission of buffered data and take supplementary mechanism if determined that SPS does not provide resources in right time for the buffered data. The SPS may be a sidelink SPS or UL SPS. The sidelink SPS may also be (de-)configured by the network and operate similarly as UL SPS.

The detailed procedure of determining whether the configured SPS is appropriate for transmission of buffered data and taking supplementary mechanism if determined that SPS does not provide resources in right time for the buffered data may be as follows.

1) Step 1: The network may configure the time threshold for the UE to determine whether a supplementary mechanism is necessary or not via dedicated/broadcast signaling. Alternatively, the time threshold may be fixed or specified.

2) Step 2: The data for transmission is available in the UE buffer (e.g. L2 buffer or application buffer) at time t1. The data may be any data including V2X message.

3) Step 3: If the difference between t1 and the time of next available SPS resource (t2) is larger than the time threshold, the UE may perform one of the following supplementary mechanisms.

If there is a transmission resource pool for sidelink in system information, the UE may autonomously select the pool and the transmission resources and transmit the data using the selected resources.

The UL BSR may be triggered and the UE may perform BSR transmission procedure for UL dynamic scheduling.

The sidelink BSR may be triggered and the UE may perform BSR transmission procedure for sidelink scheduling by network.

For BSR transmission, the UE may trigger SR and the triggered SR may be sent using PUCCH if there is a PUCCH resource within a certain amount of time regardless of there is a UL/SL SPS resources in t2. Otherwise, the UE may perform random access immediately regardless of there is a UL/SL SPS resources in t2. The above BSR may be new BSR for V2X message transmission.

3-1) Step 3-1: Alternatively, if the difference between t1 and t2 is larger than another time threshold and the available resources in next scheduled resource of SPS is less than the required resources for the buffered data, the UE may perform one of the above supplementary mechanisms. Another time threshold may be expected to be smaller than the time threshold configured in Step 1.

3-2) Step 3-2: Alternatively, the difference between t1 and t2 is larger than the time threshold and the priority of the buffered data is higher than the threshold priority, the UE may perform one of the above supplementary mechanisms. The threshold priority may be configured by the network or specified/fixed. The priority may be a priority of the packet/bearer/IP flow/UE. The priority of the packet/bearer/IP flow/UE may be configured by the network or given by the upper layer of the UE based on the specified rule.

Otherwise, the UE may wait for the next available SPS resource and transmit the buffered traffic using SPS.

4) Step 4: If BSR is received in Step 3, the network may allocate appropriate resource for SL or UL.

Regarding step 3 described above, the following methods may be possible 3 depending on UL SPS or SL SPS.

(1) Method 1: SL SPS scheduling in mode 1 (e.g. every 1 sec)+BSR based SL scheduling in mode 1 (e.g. when shorter period is needed). If V2X data is available for TX and if the next SL SPS resource is available after X ms, e.g. 950 ms, the UE may send SL BSR. Otherwise, the UE may wait for the next SL SPS resource where UE transmits V2X message in SL.

(2) Method 2: SL SPS scheduling in mode 1 (e.g. every 1 sec)+UE autonomous SL transmissions in Mode 2. If V2X data is available for TX and if the next SL SPS resource is available after X ms, e.g. 950 ms, the UE may transmit V2X message in SL by using mode 2 TX resource pool. Otherwise, the UE may wait for the next SL SPS resource where UE transmits V2X message in SL.

(3) Method 3: UL Dynamic scheduling+UL SPS scheduling. If V2X data is available for TX and if the next UL SPS resource is available after X ms, e.g. 950 ms, the UE may send UL BSR. Otherwise, the UE may wait for the next UL SPS resource where UE transmits V2X message in UL.

(4) Method 4: SL mode 2 transmission+UL SPS scheduling. If V2X data is available for TX and if the next UL SPS resource is available after X ms, e.g. 950 ms, the UE may transmit V2X message in SL by using mode 2 TX resource pool. Otherwise, the UE may wait for the next SL SPS resource where UE transmits V2X message in SL.

Figure 10:
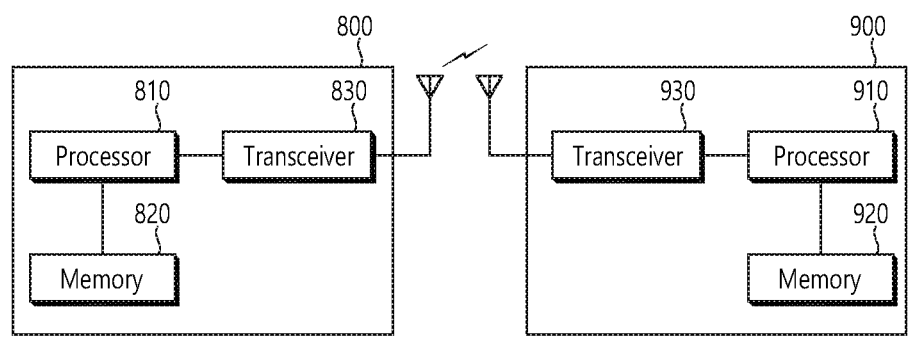
FIG. 10 shows a wireless communication system to implement an embodiment of the present invention.

FIG. 10 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, data loss can be avoided during path switching.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting vehicle-to-everything (V2X) data, by a user equipment (UE), in a wireless communication system, the method comprising:
storing, by a patch switching layer of the UE, the V2X data, which is not transmitted yet on an old path, in a transmission buffer;
identifying, by the path switching layer of the UE, whether data from a sidelink V2X channel (SVCH) is included in the stored V2X data;
re-submitting, by the path switching layer of the UE, the V2X data stored in the transmission buffer to a lower layer of a new path; and
transmitting the V2X data based on logical channel prioritization (LCP) procedure to a target of the new path,
wherein if the path switching layer of the UE identified that the data from the SVCH is included in the stored V2X data, the data from the SVCH is selected prior to data from a sidelink traffic channel (STCH) in the LCP procedure by the UE, and
wherein if the path switching layer of the UE identified that the data from the SVCH is not included in the stored V2X data, the UE transmits the stored V2X data which is data from multiple logical channels in decreasing order of logical channel priority.

2. The method of claim 1, wherein the path switching layer of the UE is located right above a packet data convergence protocol (PDCP) layer of the UE.

3. The method of claim 1, wherein the lower layer is one of a PDCP layer of the UE or a radio link control (RLC) layer of the UE.

4. The method of claim 1, wherein the old path is an uplink (UL) and the new path is a sidelink (SL).

5. The method of claim 1, wherein the old path is a sidelink (SL) and the new path is an uplink (UL).

6. The method of claim 1, further comprising discarding the V2X data stored in the transmission buffer when latency requirement is not met.

7. A user equipment (UE) in a wireless communication system, the UE comprising:
   a memory;
   a transceiver; and
   a processor, coupled to the memory and the transceiver, that:
   stores, by a path switching layer of the UE, vehicle-to-everything (V2X) data, which is not transmitted yet on an old path, in a transmission buffer,
   identifies, by the path switching layer of the UE, whether data from a sidelink V2X channel (SVCH) is included in the stored V2X data,
   re-submits, by the path switching layer of the UE, the V2X data stored in the transmission buffer to a lower layer of a new path, and
   transmits the V2X data based on logical channel prioritization (LCP) procedure to a target of the new path,
   wherein if the path switching layer of the UE identified that the data from the SVCH is included in the stored V2X data, the data from the SVCH is selected prior to data from a sidelink traffic channel (STCH) in the LCP procedure by the UE,
   wherein if the path switching layer of the UE identified that the data from the SVCH is not included in the stored V2X data, the UE transmits the stored V2X data which is data from multiple logical channels in decreasing order of logical channel priority.

8. The UE of claim 7, wherein the path switching layer of the UE is located right above a packet data convergence protocol (PDCP) layer of the UE.

9. The UE of claim 7, wherein the lower layer is one of a PDCP layer of the UE or a radio link control (RLC) layer of the UE.

10. The UE of claim 7, wherein the old path is an uplink (UL) and the new path is a sidelink (SL).

11. The UE of claim 7, wherein the old path is a sidelink (SL) and the new path is an uplink (UL).

12. The UE of claim 7, wherein the processor further discards the V2X data stored in the transmission buffer when latency requirement is not met.

* * * * *